Feb. 15, 1938.　　S. B. MARTIN ET AL　　2,108,265

PIPE OR ROD COUPLING

Filed Dec. 14, 1936

Inventors
Stoddard B. Martin
Charles Bernard Waechter
By Hauxford & Van Horn Attorneys Patented Feb. 15, 1938

2,108,265

UNITED STATES PATENT OFFICE 2,108,265

PIPE OR ROD COUPLING

Stoddard B. Martin, Lakewood, Ohio, and Charles Bernard Waechter, Bradford, Pa.

Application December 14, 1936, Serial No. 115,672

3 Claims. (Cl. 285—196)

Our invention is an improvement in pipe and rod couplings and relates more particularly to such means for coupling pipe or rod sections quickly and easily, even though the sections are not in strict alignment.

Our invention has for one of its objects to provide an effective rod and pipe coupling in which the sealing pressure is uniformly distributed around the coupled members even though the members are not in alignment.

Another object of the invention consists in the provision of separable wedges operating to exert axial pressure against a packing having a beveled surface, and against a collar completely housing the wedges, packing and an end of one of the coupled sections.

A further object is to increase the ease with which sections of pipe or rod may be coupled or uncoupled by providing pressure exerting wedges of the double wedge type, that is, those having their opposite side walls formed to converge at one end toward the center line of the wedge.

A still further object of the invention is to provide a wedge of this type which is provided at one end with means for driving engagement with a tool in applying or removing the same.

Another object of our invention consists in the provision of a packing member which is characterized by its nonflowing characteristics under pressure and which is reinforced along one end for this purpose.

Among other objects of the invention is the provision of a coupling means which is capable of forming a uniformly distributed fluid tight seal between the sections to be coupled which will eliminate leakage even though the sections are not strictly in alignment.

Other objects and advantages of our invention will become more apparent from the following description of an embodiment thereof, reference being made to the accompanying drawing in which like reference characters are employed to designate like parts throughout the same.

In the drawing:—

Figure 1:
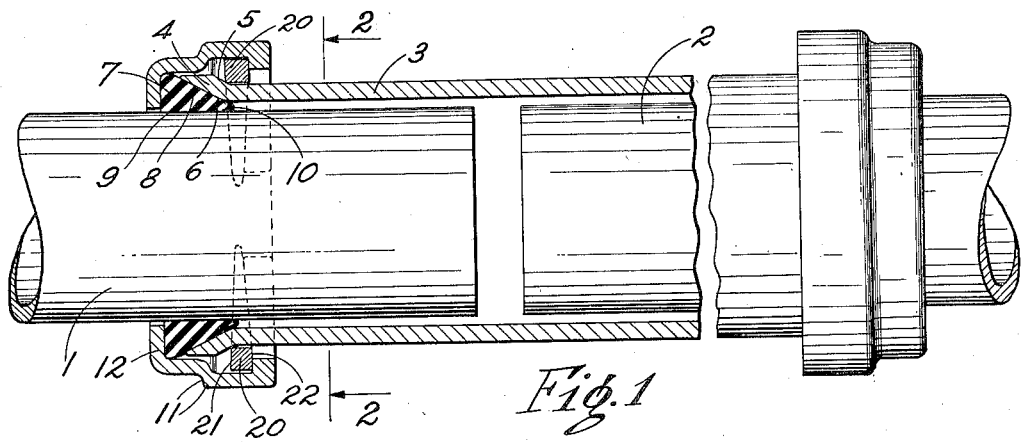
Figure 1 is a view of a device embodying our invention, shown partly in section to illustrate the manner of coupling a pair of pipe sections.

In carrying out our invention as illustrated in the drawing, the ends of the pipe sections 1 and 2 are inserted into opposite ends of a cylindrical sleeve or connecting member 3. Each end of the sleeve is formed with an outwardly inclined flange 4 providing annularly inclined outer and inner surfaces 5 and 6 respectively. The outer diameter of the flange 4 is only slightly greater than the outer diameter of the sleeve 3, but the inclined wall 6 of the flange is sufficiently wide to form a seat for the greater portion of the adjacent face of the packing 7 when the parts are assembled.

Figure 3:
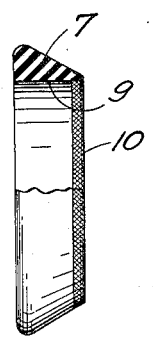
Figure 3 is a side elevation of a packing ring, shown partly in section, which forms part of the present invention.

The packing member 7 consists principally of a molded annulus of rubber or other suitable flexible material, and is substantially triangular in cross section as shown in Figure 3. The inclined wall 8 of the packing is the longer wall and is adapted to lie flat against the adjacent under surface 6 of the flange 4 as shown for the greater portion of its length. The bore of the packing is cylindrical and is represented by the wall 9. This packing is subject to high compression and the consequent tendency to "flow" in the vicinity of the point where the walls 8 and 9 converge. In order to prevent flowing of the packing material under compression and to reinforce the same, we have provided an annulus of metal 10 which is preferably attached or secured to the packing as a part thereof during the molding process. The metal annulus 10 may consist of a channeled member formed of wire mesh to permit the packing material to be forced into the interstices of the mesh, or the member 10 may be of sheet having a roughened inner surface for the same purpose.

In any event the annulus 10, carried by the packing, resists and prevents flowing of the packing material 7 under pressure in use, and materially increases the useful life of the packing.

Each end of the tube or sleeve 3 carries a cap or collar 11 which overlies the end of the tube and the adjacent telescoped end of the pipe or rod section. The collars are removable and comprise an inwardly extending annular packing engaging flange 12, an offset annular body portion 11, and a plurality of inwardly extending bearing members 13 arranged at substantially diametrically opposite points and lying entirely within the confines of the body portion 11.

Figure 6:
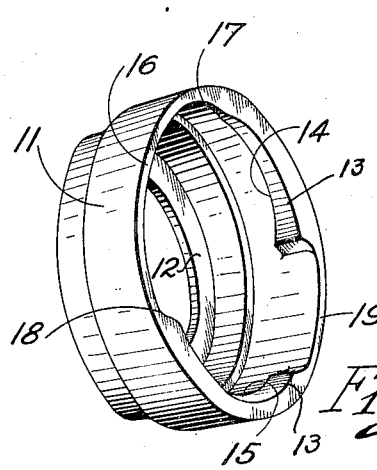
Figure 6 is a perspective view of a collar with which the wedges and packing engage.

Each of the bearing members 13 is formed integral with the body 11. Their inner bearing walls 14 and 15 respectively are inclined in opposite directions around the periphery of the cap as illustrated in Figure 6 to provide opposed wedge supporting and bearing faces. As will be seen in Figures 2 and 6 the walls 14 and 15 are inclined inwardly of the cap to form substantially reversed partial helixes, that portion of the edge of the cap indicated at 16 between the points 17 and 18 being wider than the opposite portion 19 so as to more readily permit the insertion of the wedge members within the cap for sliding engagement with the inclined walls 14 and 15.

Figures 4, 5:
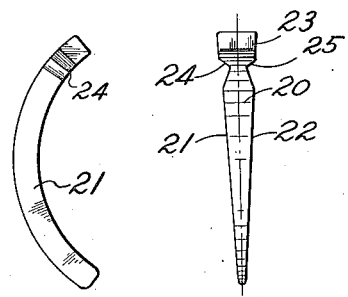
Figure 4 is a side elevation of one of the wedges.
Figure 5 is a front elevation of the wedge shown in Figure 4.

The wedge members above referred to comprise preferably a body 20 of arcuate form such as is indicated in Figures 4 and 5. The side walls 21 and 22 of each wedge converge equally along the center line from the vicinity of the head portion 23 to a point at the opposite end to provide double faced wedge.

In order to facilitate assembly and disassembly of the wedges, they are provided with a head portion 23 at the opposite end. Adjacent the head portion notches 24 and 25 are provided to permit driving engagement with a screw driver, chisel or like instrument in removing the wedges.

Figure 2:
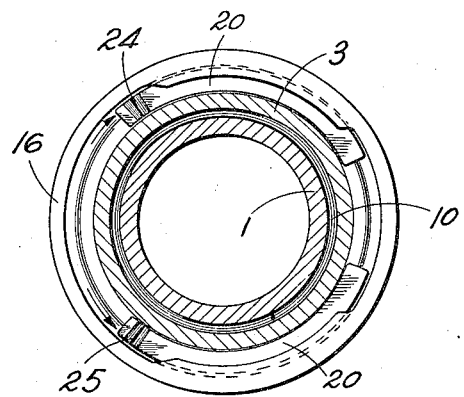
Figure 2 is a vertical section taken on line 2—2 of Figure 1.

In Figure 2 the arrows indicate the direction of driving the wedges to couple an end of a pipe or rod section with an end of the sleeve 3. To remove the wedges a screw driver is inserted in the notches 24 and 25 and the wedges are driven in opposite directions to the arrows.

In use the coupling may be assembled as follows, particular reference being made to Figure 1 for this purpose.

To couple one pipe or rod section 1 in an end of the sleeve 3, the packing ring 7 is telescoped over the end of the section 1 for a sufficient distance to permit the end of the section to be disposed well within the sleeve 3. The inclined wall 8 of the packing engages the inclined inner wall 6 of the annular flange 4, the reinforced end 10 of the packing normally lying along the wall of the section wall and the wall 6 of the flange. The cap 11, which has been previously slipped over the end of the section, is positioned so that its inwardly extending flange 12 engages and embraces the rear wall of the packing ring 7, as shown. The operator then inserts the wedges between the oppositely disposed bearing members by inserting first the pointed end of each between the inclined wall 5 and one of the respective bearing members 13 and then sliding the same in opposite directions of rotation as indicated by the arrows in Figure 2. As the wedges slide along the oppositely inclined walls 14 and 15, they exert a longitudinal pressure against the flange 5 and the bearing members 13, thus forcing the cap 11 axially toward the sleeve 3 to compress the packing against the inner walls 6.

The wedges may now be driven home to exert additional pressures on the packing and to thereby provide a fluid tight seal at the union of the sleeve and section 1, by striking the heads 23 of the wedges with a hammer in their respective directions of travel. Due to the use of wedges as distinguished from cams, we are enabled not only to obtain and maintain a better seal at the coupling, but such a seal is obtained even though the pipe section 1 is not in exact alignment with the sleeve 3. We have found that due to the double faced wedges, these units tend to compensate for such disalignment and seek their proper seating relation with respect to the inclined annular wall 5 and the adjacent bearing faces 14 or 15 of the bearing members 13.

The opposite end of the coupling in Figure 1 is assembled in the same manner.

To disassemble the coupled ends of the pipe sections and the sleeve it is only necessary to insert the pointed end of a tool such as a screw driver in the notches of the wedges and drive them in an opposite direction. After the wedges are removed, the pipe or rod sections are easily withdrawn from the sleeve 3 and the cap 11 and packing ring 7 are removed over the end of the section.

Figure 7:
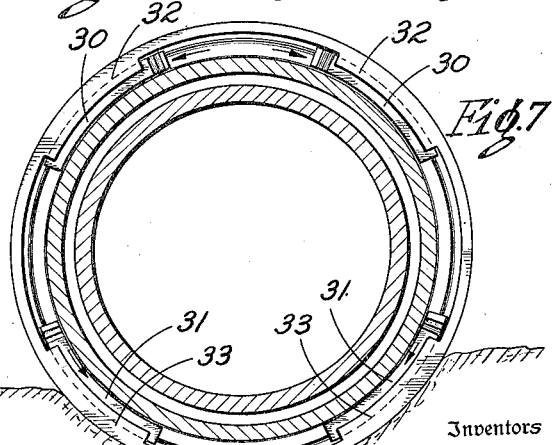
Figure 7 is a vertical section through a coupled section of pipe of much larger diameter than that shown in the remaining figures, and illustrates the desired manner of coupling such larger sections.

In Figure 7 we have illustrated the invention as applied to conduits of much larger diameter than that shown in Figure 1.

In the application to larger diameter couplings it is desirable to employ additional wedges.

Thus in Figure 7 we have shown two pairs of oppositely disposed wedges 30 and 31 and corresponding bearing members 32 and 33 respectively. In this manner the sealing pressures will be more evenly distributed around the entire circumference of the coupled parts.

Various changes in the details of construction and arrangement of parts may be made without departing from the spirit of our invention or the scope of the appended claims.

We claim:

1. A coupling of the class described including a sleeve for accommodating a pipe or rod end and having one end inclined outwardly, packing means carried by the pipe or rod end and abutting said pipe or rod end and the inner wall of the inclined sleeve end, a cap having portions overlying the packing means and the inclined wall of the sleeve and having an annular flange encircling said adjacent sleeve end, said flanged portion having a plurality of internally formed inclined bearing surfaces formed therein, and means to compress the packing against the sleeve inclined wall and the adjacent pipe or rod end, said last named means including a plurality of wedge members insertable within the annular flange and slidable circumferentially of the pipe or rod end into engagement with the respective inclined bearing surfaces formed within the annular flange.

2. A coupling of the character described including a sleeve for accommodating pipe or rod ends, the ends of said sleeve being flared outwardly to provide inclined internal walls, packing means fitting over the pipe or rod ends and having inclined circumferential walls abutting the respective inclined internal walls of the sleeve, caps carried by each end of the sleeve, said caps each comprising an annulus having internal annular flanges formed at its opposite ends, one of said flanges extending inwardly a greater distance than said other flange and adapted to abut the outer face of said packing means and to transmit forces of compression axially along said means, the other flange having formed along its inner side wall a pair of oppositely inclined bearing faces, and double faced wedge members insertable within the cap and between the bearing faces and the outer wall of the flared ends of the sleeve to move the cap axially of the sleeve and thus exert forces of compression on the packing means.

3. In a coupling a sleeve for accommodating pipe or rod ends, an end of the sleeve being flared to receive a packing member, a packing member, and means for compressing the packing member between the pipe or rod end and the sleeve in sealing relation thereto, said means including a collar having an inwardly extending annular flange engageable with the packing and having a pair of spaced apart circumferentially arranged wedge members, the internal bearing faces of said respective wedge members being inclined in opposite directions, and a pair of wedge members insertable in said collar and slidable in opposite directions along said oppositely inclined bearing surfaces to cause said first named cap flange to exert a force of compression against said packing means.

CHARLES BERNARD WAECHTER.
STODDARD B. MARTIN.